(12) United States Patent
Bang et al.

(10) Patent No.: US 10,237,827 B2
(45) Date of Patent: Mar. 19, 2019

(54) METHOD AND DEVICE FOR SELECTIVELY PERFORMING OPERATION ON BASIS OF TERMINAL OPERATION MODE

(71) Applicants: LG ELECTRONICS INC., Seoul (KR); KOREA ADVANCED INSTITUTE OF SCIENCE AND TECHNOLOGY, Daejeon (KR)

(72) Inventors: Inkyu Bang, Seoul (KR); JaYeong Kim, Daejeon (KR); Dan Keun Sung, Seoul (KR); Yunjung Yi, Seoul (KR); Kijun Kim, Seoul (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/741,169

(22) PCT Filed: Jul. 4, 2016

(86) PCT No.: PCT/KR2016/007186
§ 371 (c)(1),
(2) Date: Dec. 29, 2017

(87) PCT Pub. No.: WO2017/003266
PCT Pub. Date: Jan. 5, 2017

(65) Prior Publication Data
US 2018/0199290 A1    Jul. 12, 2018

Related U.S. Application Data

(60) Provisional application No. 62/188,445, filed on Jul. 2, 2015.

(51) Int. Cl.
*H04B 1/38* (2015.01)
*H04W 52/02* (2009.01)
(Continued)

(52) U.S. Cl.
CPC ....... *H04W 52/0245* (2013.01); *H04W 24/02* (2013.01); *H04W 24/08* (2013.01);
(Continued)

(58) Field of Classification Search
CPC . H04W 52/0245; H04W 52/02; H04W 24/02; H04W 24/08; H04W 36/00; H04W 72/12; H04W 76/28
See application file for complete search history.

(56) References Cited

U.S. PATENT DOCUMENTS

2007/0291673 A1    12/2007  Demirhan et al.
2008/0211666 A1*   9/2008  Saidi ................ G01D 21/00
                                           340/539.22
(Continued)

FOREIGN PATENT DOCUMENTS

WO    WO 2011/142608 A2    11/2011
WO    WO 2014/178643 A1    11/2014

*Primary Examiner* — Tuan Pham
(74) *Attorney, Agent, or Firm* — Birch, Stewart, Kolasch & Birch, LLP

(57) ABSTRACT

Provided are a method by which a terminal selectively performs an operation on the basis of a terminal operation mode in a wireless communication system, and a device for supporting the method. The terminal determines a terminal group to which the terminal belongs, on the basis of a battery residual quantity and a battery residual quantity threshold value, calculates channel quality on the basis of a downlink reference signal, determines a terminal operation mode on the basis of the determined terminal group, the calculated channel quality, and the channel quality threshold value, and performs an operation on the basis of the determined terminal operation mode, wherein the terminal group can be any one of an energy insufficient group (EIG) and an energy sufficient group (ESG).

13 Claims, 19 Drawing Sheets

(51) Int. Cl.
    *H04W 24/02*      (2009.01)
    *H04W 24/08*      (2009.01)
    *H04W 36/00*      (2009.01)
    *H04W 72/12*      (2009.01)
    *H04W 76/28*      (2018.01)

(52) U.S. Cl.
    CPC ........... *H04W 36/00* (2013.01); *H04W 52/02* (2013.01); *H04W 72/12* (2013.01); *H04W 72/1231* (2013.01); *H04W 76/28* (2018.02); *Y02D 70/122* (2018.01); *Y02D 70/126* (2018.01); *Y02D 70/24* (2018.01)

(56)          References Cited

U.S. PATENT DOCUMENTS

| | | |
|---|---|---|
| 2013/0343252 A1 | 12/2013 | Chakraborty et al. |
| 2014/0075220 A1* | 3/2014 | Song ................ H04W 52/0277 |
| | | 713/320 |
| 2016/0081023 A1* | 3/2016 | Ji ........................ H04W 88/02 |
| | | 370/311 |

* cited by examiner

METHOD AND DEVICE FOR SELECTIVELY PERFORMING OPERATION ON BASIS OF TERMINAL OPERATION MODE

CROSS REFERENCE TO RELATED APPLICATIONS

This application is the National Phase of PCT International Application No. PCT/KR2016/007186, filed on Jul. 4, 2016, which claims priority under 35 U.S.C. 119(e) to U.S. Provisional Application No. 62/188,445, filed on Jul. 2, 2015, all of which are hereby expressly incorporated by reference into the present application.

BACKGROUND OF THE INVENTION

Field of the Invention

The present invention relates to a wireless communication system, and more particularly, to a method for selectively performing, by a user equipment (UE) or base station (BS), an operation based on a UE operation mode in a wireless communication system, and a device supporting the same.

Related Art

System capacity provided by existing LTE-based systems may have a limitation in providing a variety of smartphone-based application services currently in fast-growing demand. While the development of 5G mobile communication systems is in progress around the world in response to rapidly changing user demands, clear outlines for the systems have not yet made. 5G systems are aimed at not only increasing system capacity but also providing user-centric services, which evolve from existing network-centric services, in close collaboration between a user equipment (UE) and a network.

In the current operation of an LTE network, for a downlink service, a base station (BS) requires a UE to necessarily report channel state information (CSI), and the UE may employ a discontinuous reception (DRX) operation in order to save the battery.

SUMMARY OF THE INVENTION

User-perceived quality is a performance metric that is subjective depending on the individual user but has been measured on the basis of uniform criteria due to the functional limitations of a communication system. For example, conventional user-perceived quality is assessed mainly based on the quality of a channel between a user equipment (UE) and a base station (BS). However, since the remaining battery level of a UE is a major factor that affects user-perceived quality and is an easily measurable parameter, it is necessary to newly define perceived quality that reflects the remaining battery level of a UE. Furthermore, in order to provide user-centric services, the operations of a UE and a BS need to be changed depending on the cause of deterioration in perceived quality, in view of remaining battery level-reflected perceived quality. Accordingly, new operations of a UE and a BS need to be proposed to improve UE user-perceived quality reflecting the remaining battery level. One embodiment of the present invention proposes a method in which a UE determines a UE operation mode and selectively performs an operation based on the determined UE operation mode, and a device supporting the same.

According to one embodiment, there is provided a method for selectively performing, by a UE, an operation based on a UE operation mode in a wireless communication system. The method may include: determining a UE group to which the UE belongs based on a remaining battery level and a remaining battery threshold value; calculating channel quality based on a downlink reference signal; determining a UE operation mode based on the determined UE group, the calculated channel quality, and a channel quality threshold value; and performing an operation based on the determined UE operation mode, wherein the UE group may be either an energy-insufficient group (EIG) or an energy-sufficient group (ESG).

When the determined UE group is the EIG, the calculated channel quality is equal to or less than the channel quality threshold value, and the UE is not scheduled to be handed over, the UE operation mode may be determined to be a battery efficiency mode. The remaining battery level may be equal to or less than the remaining battery threshold value. The method may further include stopping, by the UE, data transmission and reception until the channel quality exceeds the channel quality threshold value. The method may further include setting, by the UE, off-duration for stopping data transmission and reception. The off-duration may be set by the UE based on the calculated channel quality, the channel quality threshold value, and a delay constraint of the UE. The method may further include transmitting, by the UE, a battery efficiency mode indicator to a base station (BS).

When the determined UE group is the EIG, the calculated channel quality is equal to or less than the channel quality threshold value, and the UE is scheduled to be handed over, the UE operation mode may be determined to be a handover preparation mode. The method may further include transmitting, by the UE, a handover candidate BS index to a BS, wherein the handover candidate BS index may be set by the UE based on a reference signal measurement.

When the determined UE group is the EIG and the calculated channel quality exceeds the channel quality threshold value, the UE operating mode may be determined to be a normal mode. The method may further include transmitting, by the UE, a channel feedback format corresponding to the determined UE operation mode to a BS.

The method may further include transmitting, by the UE, a changed UE group to a BS when the UE group to which the UE belongs is changed, wherein: when the UE is in an RRC_CONNECTED mode, the changed UE group may be transmitted to the BS using a channel feedback format; and when the UE is in an RRC_IDLE mode, the changed UE group may be transmitted to the BS using a random access procedure.

According to another embodiment, there is provided a method for selectively performing, by a BS, downlink scheduling based on a channel feedback format in a wireless communication system. The method may include: receiving a channel feedback format from a UE; and determining whether to perform downlink scheduling based on the received channel feedback format.

When the channel feedback format indicates that the UE operates in a battery efficiency mode, the BS may determine not to perform downlink scheduling. The downlink scheduling may not be performed until the BS receives another channel feedback format from the UE.

When the channel feedback format indicates that the UE operates in a handover mode, the BS may determine to perform downlink scheduling. The method may further include transmitting, by the BS, a possibility of handover of the UE to a neighboring BS based on information included in the channel feedback format.

According to still another embodiment, there is provided a UE for selectively performing an operation based on a UE operation mode in a wireless communication system. The UE may include: a memory; a transceiver; and a processor to connect the memory and the transceiver, wherein the processor may be configured to: determine a UE group to which the UE belongs based on a remaining battery level and a remaining battery threshold value; calculate channel quality based on a downlink reference signal; determine a UE operation mode based on the determined UE group, the calculated channel quality, and a channel quality threshold value; and perform an operation based on the determined UE operation mode, and the UE group may be either an energy-insufficient group (EIG) or an energy-sufficient group (ESG).

It is possible to improve the perceived quality of a UE.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
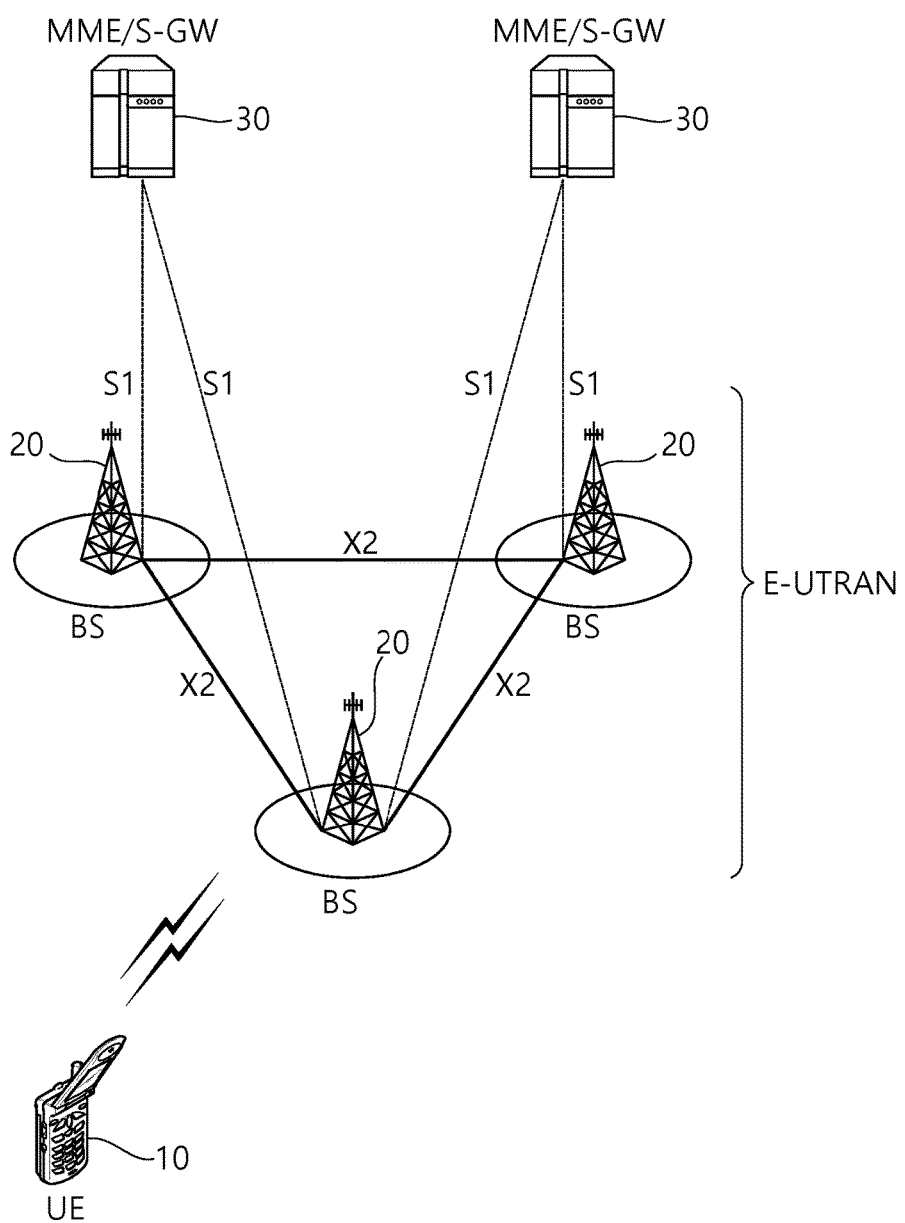
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
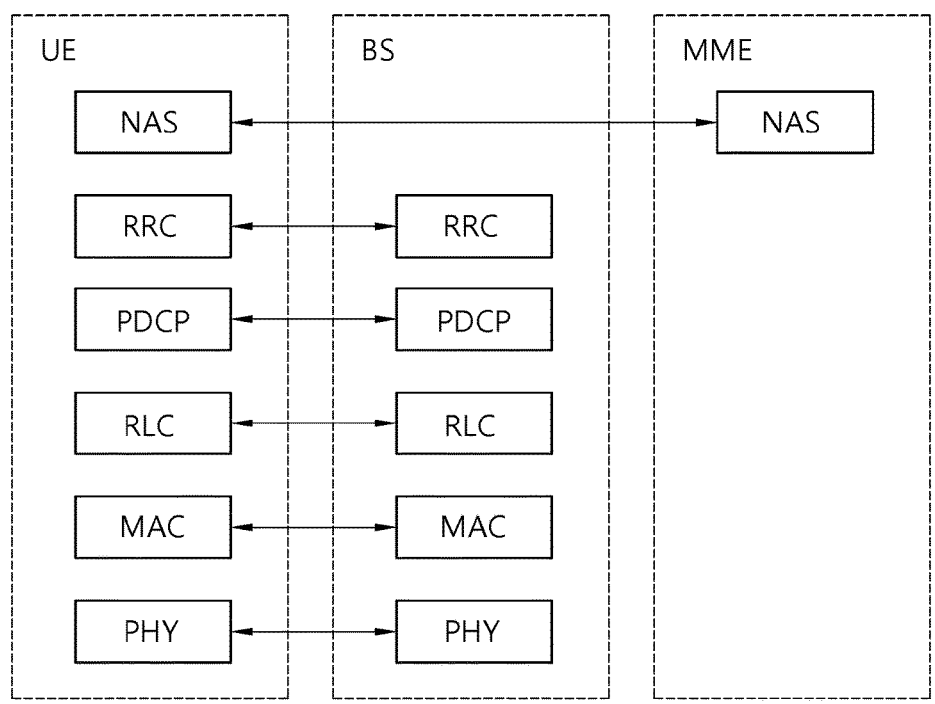
FIG. 2 shows a control plane of a radio interface protocol of an LTE system.
Figure 3:
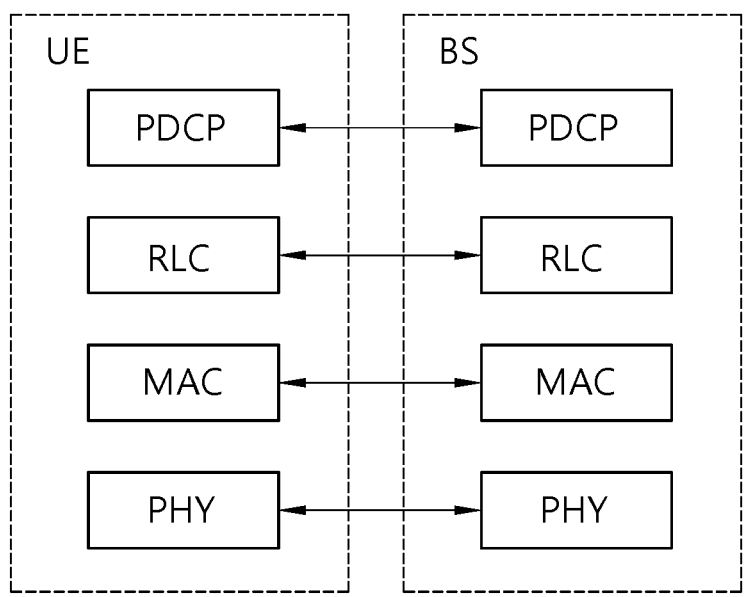
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, discontinuous reception (DRX) is described.

In a wireless communication system, packet data traffic is very bursty. That is, a large amount of transmission may occur for a transient period of time, and then no transmission may occur for a long time. In addition, no transmission may occur for a long time, and then a large amount of transmission may occur in a moment. From the aspect of a delay, a UE may need to observe downlink control signaling every subframe and to immediately respond to a change in traffic in order to receive an uplink scheduling grant or downlink data transmission. However, since power consumption by a reception circuit of the UE is not negligible, the continuous operation of the reception circuit may cause an increase in the power consumption of the UE. Therefore, in order to reduce the power consumption of the UE, LTE may support discontinuous reception (DRX).

Figure 4:
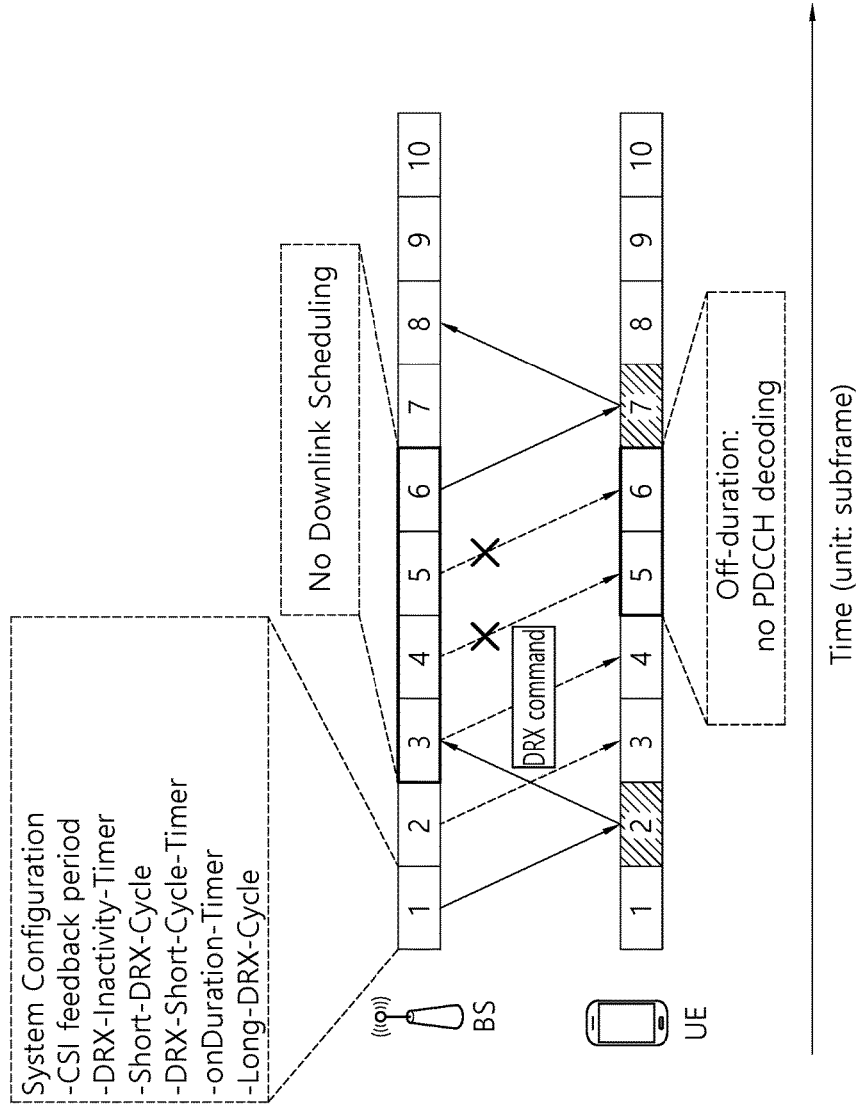
FIG. 4 shows an example of a conventional (discontinuous reception) DRX operation.

FIG. 4 shows an example of a conventional DRX operation.

Referring to FIG. 4, via a first subframe, a BS may transmit, to a UE, a system configuration including at least one of a channel state information (CSI) feedback period, a DRX inactivity timer, a short DRX cycle, a short DRX cycle, a DRX short cycle timer, an on duration timer, and a long DRX cycle. Since the UE cannot predict downlink scheduling for the UE, the UE performs a DRX operation based on the DRX inactivity timer or a DRX command from the BS. For example, although the BS does not perform downlink scheduling for third to sixth subframes, the UE does not decode a PDCCH only in fifth and sixth subframes, which may cause additional power consumption of the UE. Hereinafter, one embodiment of the present invention proposes a method for a UE to selectively perform an operation based on a UE operation mode, and a device supporting the same. There are also proposed a method for a BS to selectively perform downlink scheduling based on a channel feedback format, and a device supporting the same.

Hereinafter, a user-centric metric will be described according to one embodiment of the present invention.

A new user-centric metric that can be used in a wireless communication system in order to provide user-centric services may be defined. For example, the user-centric metric may be defined based on the quality of a channel between a UE and a BS. Specifically, the user-centric metric may be defined as a perceived quality function that considers not only the quality of the channel between the UE and the BS but also an estimated data rate based on the channel quality, the power consumption of the UE, and the remaining battery level of the UE. The perceived quality function may be a function of the remaining battery level of the UE and the channel quality. On average, a user having a UE with a low remaining battery level is highly likely to have lower perceived quality than a user having a UE with a high remaining battery level. For example, a perceived quality function that reflects the remaining battery level of a UE or the like may be defined by Equation 1:

$$u(r,p,l_{SoC}) = \omega(l_{SoC})u_R(r) + (1-\omega(l_{SoC}))u_{EE}(r,p,l_{SoC}), \quad \text{[Equation 1]}$$

where r is the data rate of a user, p is power consumption, and $I_{SoC}$ is a remaining battery level. The remaining battery level may be represented by a state-of-charge (SoC) level $I_{SoC}$ and may be defined as a normalized value between 0 and 1. $u_R(r)$ is a function representing perceived quality considering only a data rate and may be defined by Equation 2. $w(I_{SoC})$ is a weight for adjusting the impact of a data rate and power consumption on perceived quality according to the remaining battery level of a UE and may be defined by Equation 3. $u_{EE}(r,p,I_{SoC})$ is a function representing perceived quality considering energy efficiency that reflects power consumption and may be defined by Equation 4.

$$u_R(r) = \frac{1}{\alpha + \beta e^{-\lambda(r-R_0)}} + \delta \quad \text{[Equation 2]}$$

$\alpha$, $\beta$, $\lambda$, $\delta$, and $R_0$ are design parameters.

$$\omega(l_{SoC}) = \frac{1 - e^{-al_{SoC}}}{1 - e^{-a}} \quad \text{[Equation 3]}$$

a is a design parameter. By adjusting a, the weight for the impact of a data rate and power consumption on perceived quality may be adjusted.

$$u_{EE}(r, p, l_{SoC}) = \frac{1}{\alpha_{EE} + \beta_{EE} e^{-\lambda_{EE}(\frac{r}{p} - \eta_0(l_{SoC}))}} + \delta_{EE} \quad \text{[Equation 4]}$$

$\alpha_{EE}$, $\beta_{EE}$, $\lambda_{EE}$, and $\delta_{EE}$ are design parameters. $\eta_0(I_{SoC})$ is a user-expected value for energy efficiency. $\eta_0(I_{SoC})$ is a function that varies depending on the remaining battery level and may be defined by Equation 5.

$$\eta_0(l_{SoC}) = \frac{d}{c}(e^{-cl_{SoC}} - 1)\eta_{ref} \quad \text{[Equation 5]}$$

c and d are design parameters. $\eta_{ref}$ is a reference energy efficiency value.

Equations 1 to 5 are examples of a perceived quality function that reflects the remaining battery level of a UE or the like. Equations 1 to 5 are merely examples for explaining that a user-centric metric can be defined as a perceived quality function reflecting the quality of a channel between a UE and a BS and a remaining battery level, the user-centric metric is not limited to the perceived quality function. Furthermore, the user-centric metric is not limited to the quality of a channel between a UE and a BS or a perceived quality function.

Figure 5:
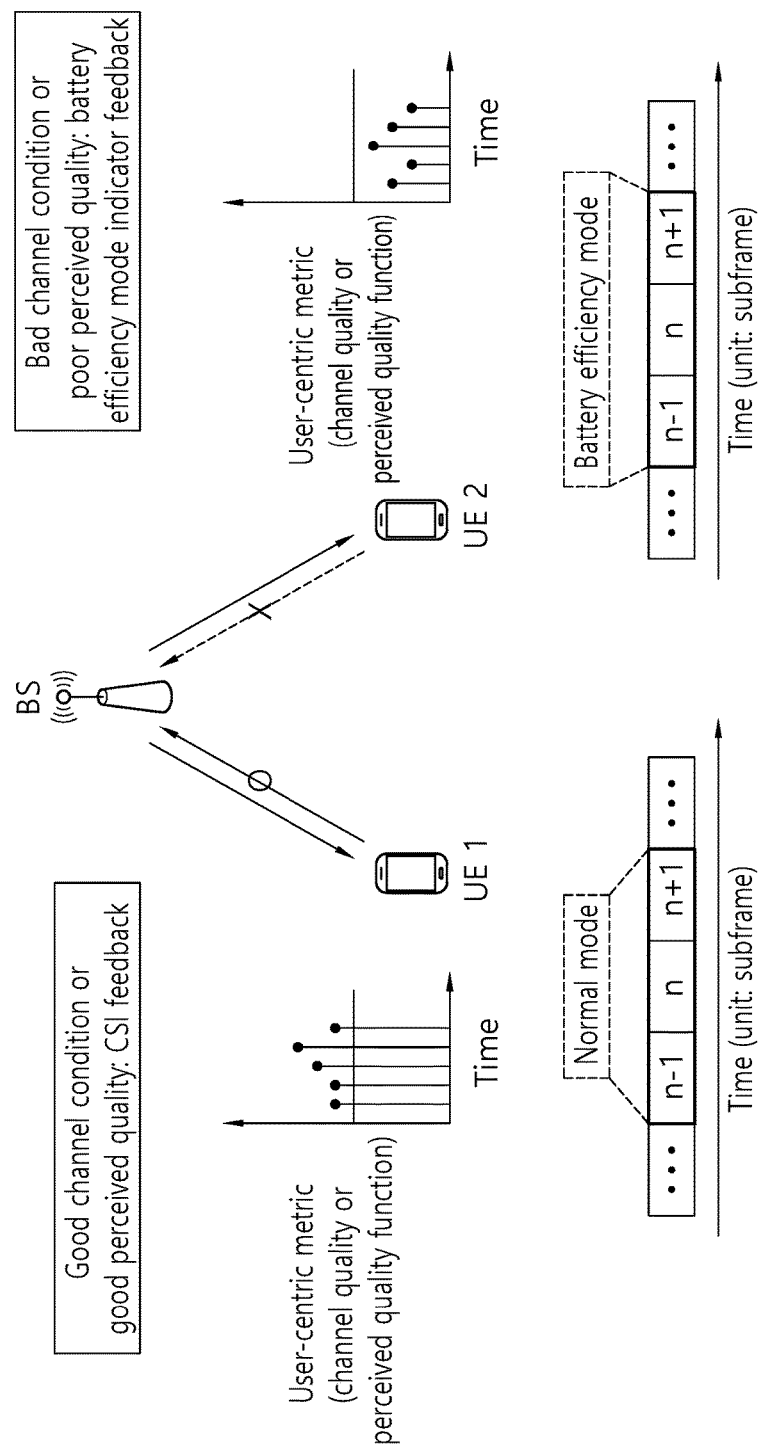
FIG. 5 shows an operation of a UE based on a user-centric metric according to one embodiment of the present invention.

FIG. 5 shows an operation of a UE based on a user-centric metric according to one embodiment of the present invention.

When a user-centric metric is defined based on channel quality, UE 1 having the assessed value of a reference signal received from a BS that is higher than a reference threshold value may normally report channel information to the BS. However, UE 2 having the assessed value of a reference signal received from the BS that is lower than the reference threshold value may not report channel information to the BS. Instead of reporting the channel information, UE 2 may report a battery efficiency mode indicator in a pre-arranged format and then may operate in a battery efficiency mode.

When a user-centric metric is defined as a perceived quality function that reflects the remaining battery level, UE 1 having a perceived quality function value that is higher than a reference threshold value can normally report channel information to a BS. However, UE 2 having a perceived quality function value that is lower than the reference threshold value may not report channel information to the BS. Instead of reporting the channel information, UE 2 may report a battery efficiency mode indicator in a pre-arranged format and then may operate in the battery efficiency mode. The battery efficiency mode will be described in detail later.

Figure 6:
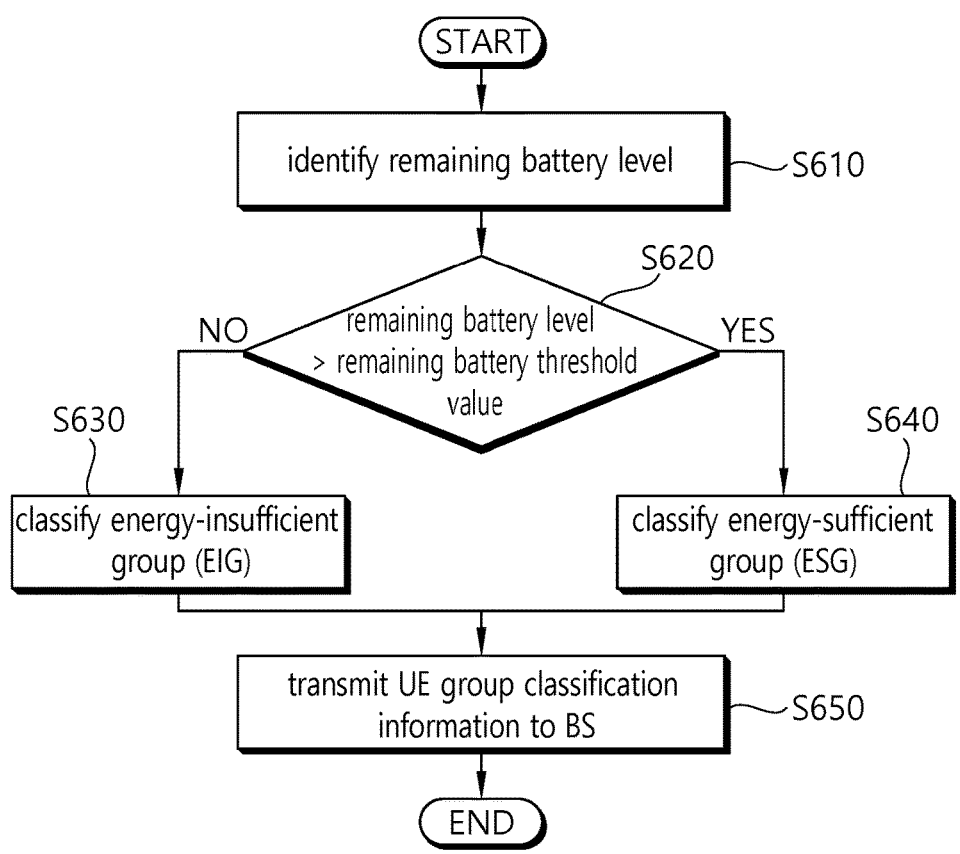
FIG. 6 shows a method for determining a UE group to which a UE belongs based on the remaining battery level according to one embodiment of the present invention.

FIG. 6 shows a method for determining a UE group to which a UE belongs based on the remaining battery level according to one embodiment of the present invention.

Referring to FIG. 6, a UE may identify a remaining internal battery level $I_{SoC}$ thereof (S610). $I_{SoC}$ may have a value between 0 and 1 depending on the remaining battery level.

The UE may compare the Isoc value with a remaining battery threshold value $I_{TH}$ (S620). $I_{TH}$ may be a preset value. A system may preset $I_{TH}$. $I_{TH}$ may be set to a different value depending on the situation. The set $I_{TH}$ value may be transmitted to all UEs through a BS. For example, when $I_{TH}$ is set to 0.3, UEs having an insufficient remaining battery level on the basis of a remaining battery level of 30% may be classified. For example, when $I_{TH}$ is set to 0.5, UEs having an insufficient remaining battery level on the basis of a remaining battery level of 50% may be classified. A system with $I_{TH}$ set to 0.5 may be a system that considers the prevention of exhaustion of a battery as more important than a system with $I_{TH}$ set to 0.3.

The UE may compare the $I_{SoC}$ value thereof with the remaining battery threshold value $I_{TH}$ and may determine whether the UE belongs to an energy-insufficient group (EIG) or an energy-sufficient group (ESG) (S630 and S640).

The UE may transmit information on a UE group to which the UE belongs to the BS (S650). For example, the UE may report the information on the UE group thereof to the BS using a reserved bit of a third step of a message transmission step in a conventional four-step random access process. For example, the UE may report the information on the UE group thereof to the BS using a new channel feedback format.

Figure 7:
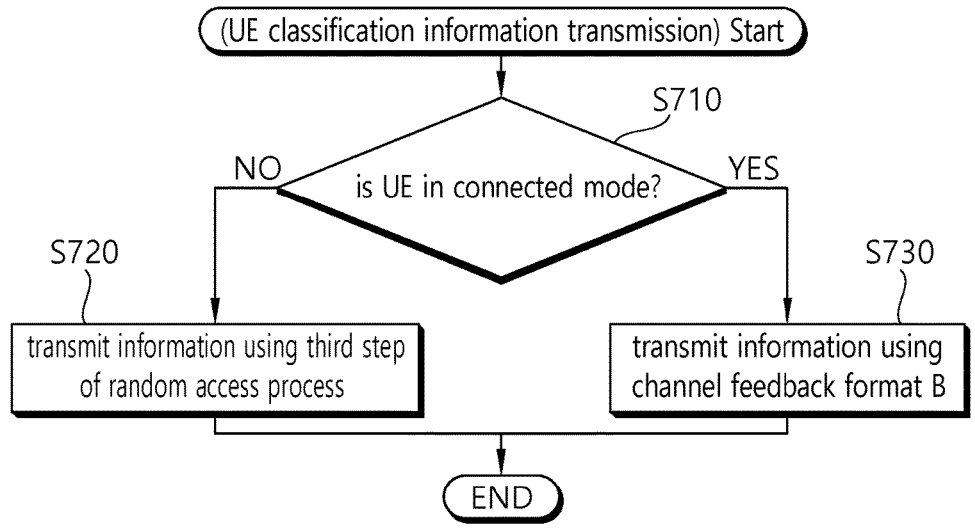
FIG. 7 shows a method for a UE to transmit UE group information to a BS according to one embodiment of the present invention.

FIG. 7 shows a method for a UE to transmit UE group information to a BS according to one embodiment of the present invention.

Referring to FIG. 7, when a UE group information change event occurs, a UE may transmit changed UE group information to a BS. The UE group information change event of the UE may be defined as follows.

Event 1: Change from ESG to EIG (ESG→EIG)
Event 2: Change from EIG to ESG (EIG→ESG)

Event 1 may occur by battery consumption over time, and event 2 may occur when a user changes or recharges a battery having a low remaining battery level.

When a UE group information change event occurs, the UE may identify whether the UE is in the RRC_CONNECTED mode (S710).

When the UE is in the RRC_ONNECTED mode, the UE may maintain a service and may report to the BS that the UE group information change event has occurred to the UE using a channel feedback format (S720). Whether the UE group information change event is event 1 or event 2 may be reported using internal information of the channel feedback format. The channel feedback format may be a newly defined channel feedback format. To distinguish from a channel feedback format for another use, a channel feedback format for indicating the occurrence of a UE group information change event may be referred to as channel feedback format B. The channel feedback format will be described in detail later.

When the UE is not in the RRC_CONNECTED mode, the UE may report to the BS that the UE group information change event has occurred to the UE using a reserved bit of a third step of a message transmission step in a random access process (S730).

Hereinafter, a method for a UE to selectively perform an operation based on a determined UE group according to one embodiment of the present invention will be described.

Figure 8:
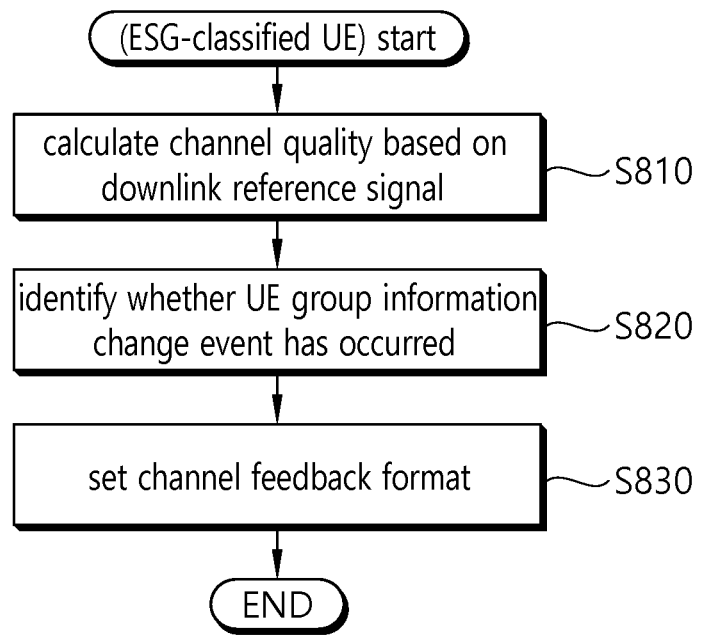
FIG. 8 shows an operation of a UE classified as an ESG according to one embodiment of the present invention.

FIG. 8 shows an operation of a UE classified as an ESG according to one embodiment of the present invention.

A UE classified as an ESG may perform a normal operation as in the existing system.

Referring to FIG. 8, the UE may calculate a channel quality based on a downlink reference signal (S810). For example, the channel quality may be defined by Equation 6.

$$P_{RS}(W_S) = \frac{1}{W_S} \sum_{n=0}^{W_S-1} P_{t-n}^{RS}$$ [Equation 6]

$P_{RS}(W_S)$ is an average downlink reference signal reception strength value obtained by averaging the strengths of previous Ws samples from the current time. $P_t^{RS}$ is downlink reference signal reception strength at time t. The characteristics of $P_{RS}(W_S)$ may be adjusted by adjusting $W_S$. When $W_S$ is set to a small value, $P_{RS}(W_S)$ may be an average value reflecting a short-term characteristics of a channel. When $W_S$ is set to a great value, $P_{RS}(W_S)$ may be an average value reflecting a long-term characteristics of a channel. In general, a short-term characteristic of a channel may be utilized to reflect the value of current or latest channel quality of a UE, and a long-term characteristic of a channel may be utilized to reflect the average value of overall channel quality of a UE over a relatively long time.

The UE may identify whether a UE group information change event has occurred (S820).

(1) When a UE group information change event occurs

Since a remaining battery level naturally decreases with time, even the UE classified as an ESG may become classified as an EIG with the lapse of time. However, the remaining battery level changes considerably slowly, compared to a channel feedback period. Therefore, the UE may not need to identify the group information change event every channel feedback period. Instead, when the UE group information change event occurs by an event triggering method, the UE may report to a BS that the UE group classification is changed from the ESG to an EIG. The UE may report the change of the UE group classification to the BS using a channel feedback format. The channel feedback format may be a newly defined channel feedback format. To distinguish from a channel feedback format for another use, a channel feedback format for indicating the occurrence of a UE group information change event may be referred to as channel feedback format B. From the next channel feedback period, the UE may be classified as the EIG and may operate accordingly. The operation of the UE classified as the EIG will be described in detail with reference to FIG. 9.

(2) When no UE group information change event occurs

The UE classified as the ESG may report the channel quality assessed through Equation 6 to the BS using a channel feedback format (S830). The channel feedback format may be a newly defined format. To distinguish from a channel feedback format for another use, a channel feedback format for reporting assessed channel quality to a BS may be referred to as channel feedback format A. The channel feedback format will be described in detail later.

Figure 9:
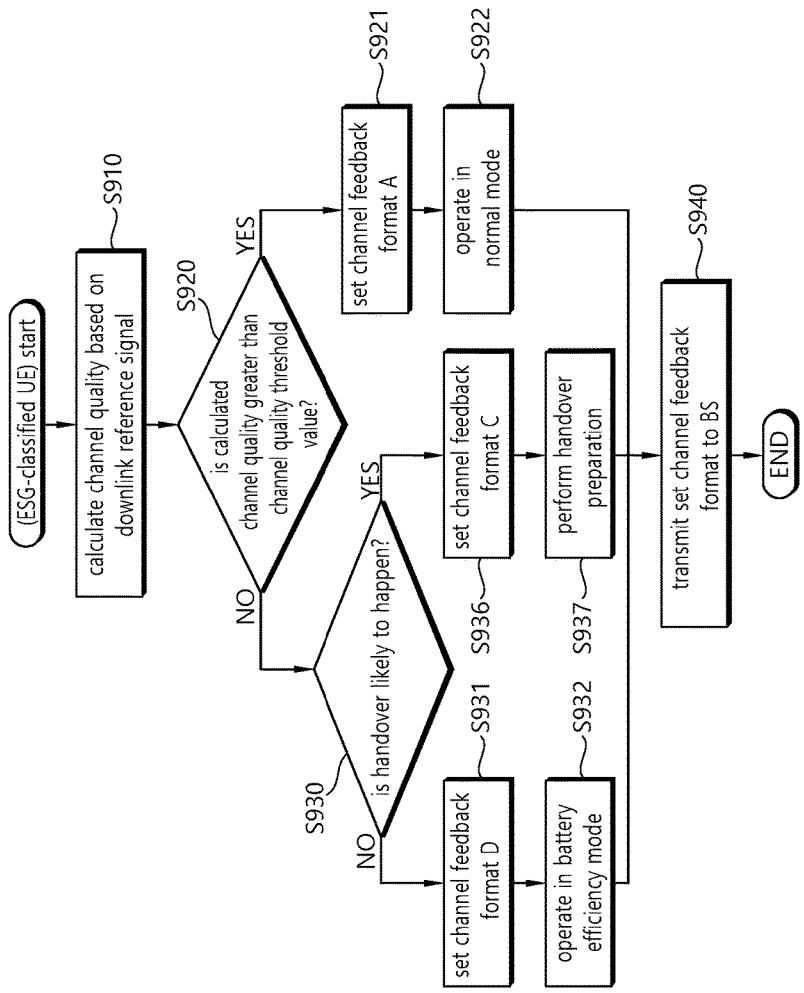
FIG. 9 shows an operation of a UE classified as an EIG according to one embodiment of the present invention.

FIG. 9 shows an operation of a UE classified as an EIG according to one embodiment of the present invention.

A UE classified as an EIG may perform various operations according to the transient channel quality. Even though a remaining battery level is low, the UE classified as the BIG may maximize user-perceived quality using the small-scale fading characteristic of a channel. The UE classified as the EIG may determine a UE operation through metric calculation and judgment by the UE. As a measure for determining a UE operation, a downlink channel quality value may be used. As a result, the UE may perform an operation based on any one of a normal mode, a handover preparation mode, and a battery efficiency mode according to the channel quality value.

Referring to FIG. 9, the UE may calculate channel quality based on a downlink reference signal (S910). Channel quality calculation may be conceptually the same as metric calculation.

The UE may compare the calculated channel quality with a channel quality threshold value (S920).

The channel quality may be calculated using Equation 6. The channel quality threshold value may be calculated using Equation 7 and Equation 8 below. Average channel quality for setting the channel quality threshold value may be defined by Equation 7.

$$P_{avg} = \frac{1}{W_L} \sum_{n=0}^{W_L-1} P_{t-n}^{RS}$$ [Equation 7]

$P_{avg}$ is an average downlink reference signal reception strength value obtained by averaging the strengths of previous $W_L$ samples from the current time. $P_t^{RS}$ is downlink reference signal reception strength at time t. Compared to Equation 6, $W_L$ may be set to be greater than $W_S$ so that $P_{avg}$ denotes an average channel value and $P_{RS}(W_S)$ denotes a current channel value (that is, $W_L \gg W_S$).

The channel quality threshold value may be defined by Equation 8.

$$P_{TH} \triangleq P_{avg} \times (1+\Delta)$$ [Equation 8]

$P_{TH}$ is a set channel quality threshold value, $P_{avg}$ is an average channel quality value defined by Equation 7, and $\Delta$ is a reference value for setting the threshold value.

For example, when $\Delta=0.2$, $P_{TH}=1.2P_{avg}$, which means that the channel quality threshold value is set to be 20% higher than the average channel quality value. The UE may compare $P_{RS}(W_S)$ with $P_{TH}$ in a judgment step. Thus, when $\Delta=0.2$, the UE may operate in the normal mode only when the current channel quality of the UE is 20% higher than average channel quality.

As a result of comparing $P_{RS}(W_S)$ with $P_{TH}$, when $P_{RS}(W_S)$ is greater than $P_{TH}$, the UE may set a channel feedback format (S921) and may operate in the normal mode (S922). The channel feedback format may include information on the calculated channel quality. The channel feedback format may be channel feedback format A.

As a result of comparing $P_{RS}(W_S)$ with $P_{TH}$, when $P_{RS}(W_S)$ is smaller than $P_{TH}$, the UE may determine the possibility of handover (S930). For example, the UE may determine whether deterioration in channel quality is caused by a temporary reason or by handover. To determine the possibility of handover, Equation 9 may be defined.

$$P_{RS}(W_S) > P_{NeighborRS} + \delta_{HO} \qquad \text{[Equation 9]}$$

$P_{RS}(W_S)$ is the current channel quality value of a serving BS calculated by Equation 6. $P_{NeighborRS}$ is the largest value among the current channel quality values of neighboring BSs calculated by Equation 6. $\delta_{HO}$ is the difference in reference signal reception power strength that is a criterion for determining handover. When Equation 9 is maintained for a certain period of time ($T_{HO}$) with respect to the same neighboring BS, it may be determined that the possibility of handover is high.

When it is determined that the possibility of handover is high, the UE may set a channel feedback format (S936) and may perform a handover preparation mode operation (S937). The channel feedback format may be a newly defined format. To distinguish from a channel feedback format for another use, a channel feedback format for reporting the possibility of handover of a UE to a BS may be referred to as channel feedback format C. The handover preparation mode operation and the channel feedback format will be described in detail later.

When it is determined that the possibility of s handover is low, the UE may set a channel feedback format (S931) and may perform a battery efficiency mode operation (S932). The channel feedback format may be a newly defined format. To distinguish from a channel feedback format for another use, a channel feedback format for reporting to a BS that a UE operates in the battery efficiency mode may be referred to as channel feedback format D. The battery efficiency mode operation and the channel feedback format will be described in detail later.

The UE may transmit the set channel feedback format to a BS (S940).

Figure 10:
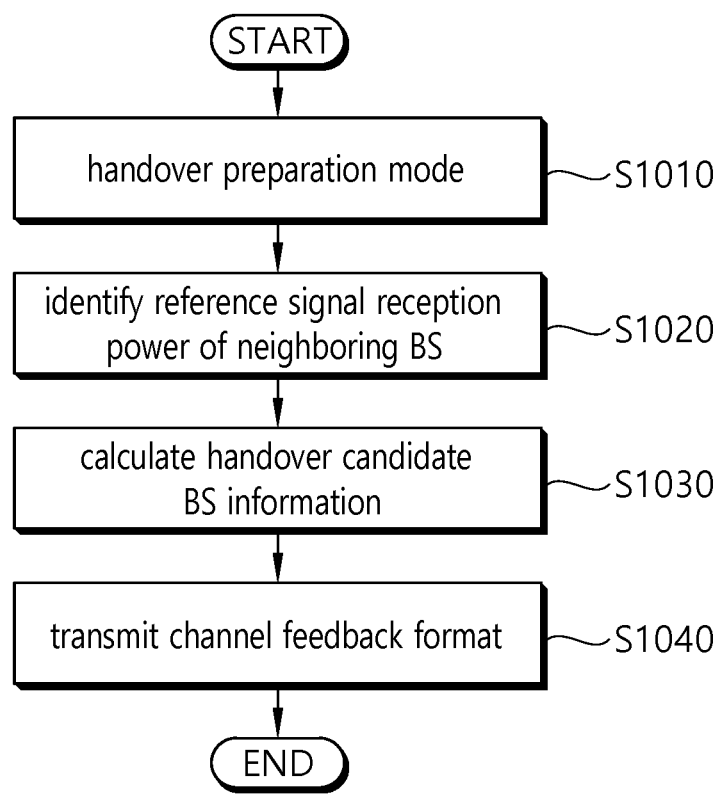
FIG. 10 shows a method for a UE to perform a handover preparation mode operation according to one embodiment of the present invention.

FIG. 10 shows a method for a UE to perform a handover preparation mode operation according to one embodiment of the present invention.

Referring to FIG. 10, a UE may determine to perform a handover preparation mode operation (S1010).

The UE may identify the reference signal reception power of a neighboring BS (S1020).

For example, the UE may utilize a measurement report based on Equation 9.

The UE may calculate handover candidate BS information (S1030). For example, the UE may select a handover candidate BS having high reference signal strength among adjacent BSs using a measurement report method. Further, the UE may set a handover candidate BS index.

The UE may transmit a channel feedback format to the BS (S1040). The channel feedback format may be channel feedback format C. The channel feedback format may include the handover candidate BS information. The channel feedback format may include the handover candidate BS index.

Figure 11:
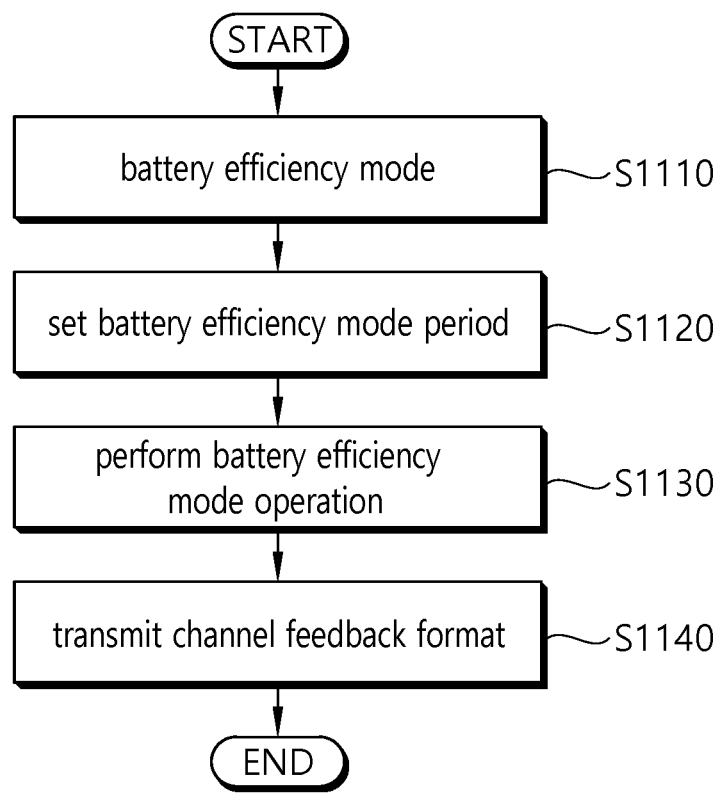
FIG. 11 shows a method for a UE to perform a battery efficiency mode operation according to one embodiment of the present invention.

FIG. 11 shows a method for a UE to perform a battery efficiency mode operation according to one embodiment of the present invention.

Referring to FIG. 11, a UE may determine to perform a battery efficiency mode operation (S1110).

The UE may set a battery efficiency mode period (S1120). For example, the UE may predict the flow of channel quality by accumulating the downlink reference signal reception power value of a serving BS and may proactively set off-duration using accumulated data in the battery efficiency mode operation. Equation 10 may express, in dB, the difference between the channel quality threshold value of the UE and the current channel quality value.

$$\gamma_{DRX} = 10 \log_{10} P_{TH} - 10 \log_{10} P_{RS}(W_S) \qquad \text{[Equation 10]}$$

$\gamma_{DRX}$ is a parameter used to set a battery efficiency mode period. $P_{RS}(W_S)$ is the current channel quality of a UE based on Equation 6. $P_{TH}$ is a channel quality threshold value based on Equation 8. $\gamma_{DRX}$ is represented by an equation expressing in dB the difference of the current channel quality (short-term average) of the UE from the channel quality threshold value. For example, when the current channel quality is half the channel quality threshold value, $\gamma_{DRX}=3$. Generally, a UE operating in the battery efficiency mode may mean that the current channel quality is lower than the channel quality threshold value, and thus $P_{TH} \geq P_{RS}(W_S)$, resulting in $\gamma_{DRX} > 0$.

The battery efficiency mode period may be defined by Equation 11. The battery efficiency mode period may be determined based on $\gamma_{DRX}$ and a delay constraint of the UE.

$$T_{off} = f_{DRX}(\gamma_{DRX}, D) \qquad \text{[Equation 11]}$$

$T_{off}$ is a battery efficiency mode period (a multiple of a channel information feedback period). $\gamma_{DRX}$ is the difference between a current channel quality and a channel quality threshold value expressed in dB, which is defined by Equation 10. D is a delay constraint of a UE. $f_{DRX}(\bullet)$ is a mapping function. $f_{DRX}(\bullet)$ may be designed variously in view of system characteristics. For example, $T_{off}$ may be defined by Equation 12.

$$T_{off} = \qquad \text{[Equation 12]}$$
$$(\log_2(\gamma_{DRX}+1)) \times U_{step}\left(\log_2(\gamma_{DRX}+1) + 1 - \frac{D}{T_{CSI}}\right) + 1$$

$U_{step}(\bullet)$ is a step function, which is 1 only when an input value of the function is 0 or greater, and is 1 otherwise. $T_{CSI}$ is a channel information feedback period.

For example, assuming that $\gamma_{DRX}=3$ based on a result of calculation in Equation 10, $\log_2(\gamma_{DRX}+1)=2$ and $U_{step}(3-D/T_{CSI})$ is 1 or 0 depending on the result of $\log_2(\gamma_{DRX}+1)+1-D/T_{CSI}=3-(D/T_{CSI})$. Equation 12 may determine $T_{off}$ by applying the result of Equation 10 to the logarithmic function. However, Equation 12 may determine in advance, using $U_{step}(\bullet)$ whether the result of calculation based on the logarithmic function causes a result exceeding the delay constraint. When the result of calculation in the step function causes the delay constraint, $T_{off}=1$ (the same as the channel feedback period). Otherwise, $T_{off}=3$ (three times the channel feedback period).

The UE may perform the battery efficiency mode operation (S1130). The battery efficiency mode operation may be performed during the battery efficiency mode period. During the battery efficiency mode period, the UE may stop data transmission and reception. However, when the channel quality becomes better than the channel quality threshold value during the battery efficiency mode period, the UE may stop the battery efficiency mode operation. The battery efficiency mode operation is different from a conventional DRX operation in that a conventional DRX period is set by a network and cannot be set by a UE. Furthermore, the battery efficiency mode operation is different from the conventional DRX operation in that the UE can start data transmission and reception when the channel quality is improved during the battery efficiency mode operation.

The UE may transmit a channel feedback format to a BS (S1140). The channel feedback format may be channel feedback format D. The channel feedback format may include the battery efficiency mode period.

Figure 12A:
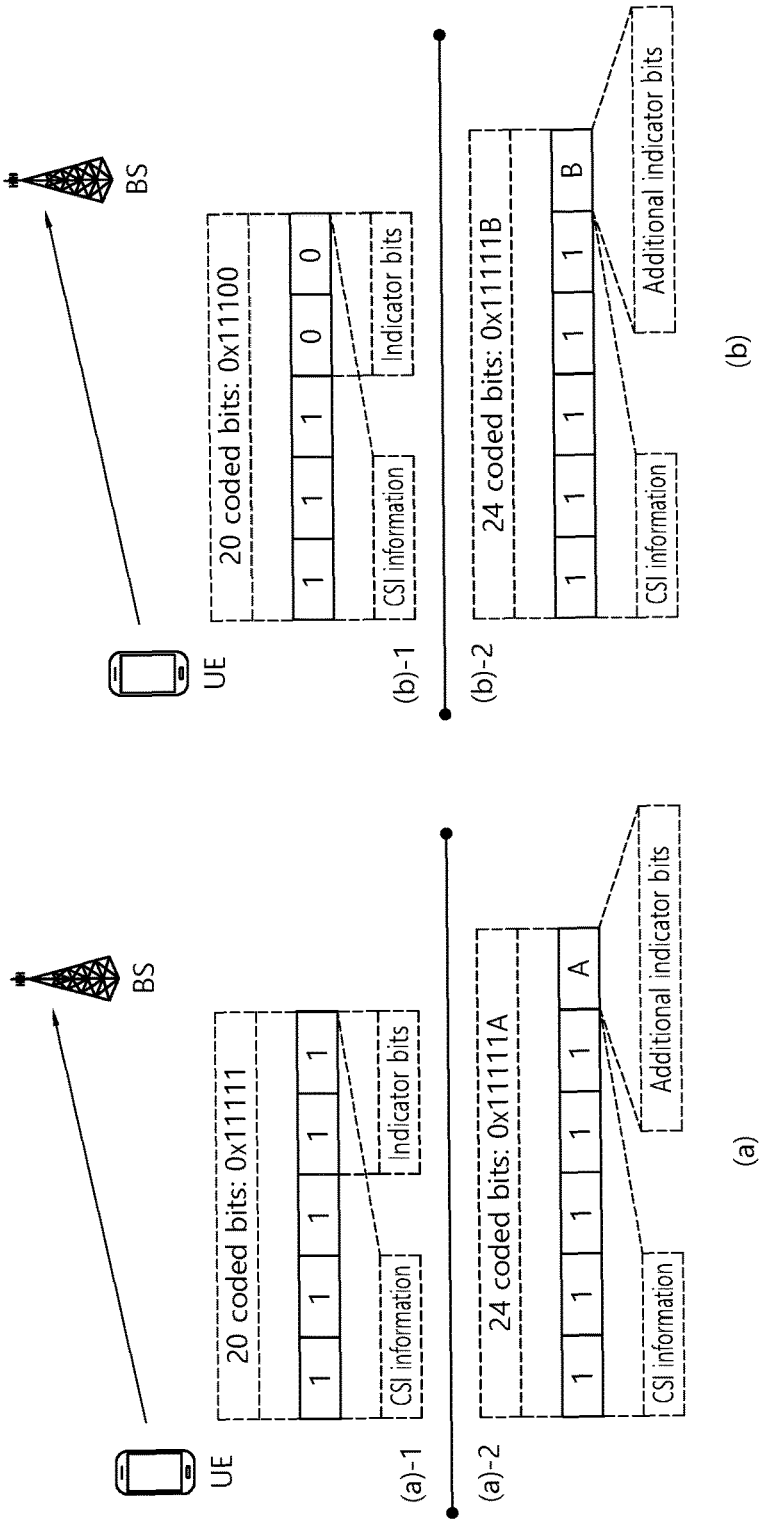
FIGS. 12A and 12B show a newly defined channel feedback format according to one embodiment of the present invention.
Figure 12B:
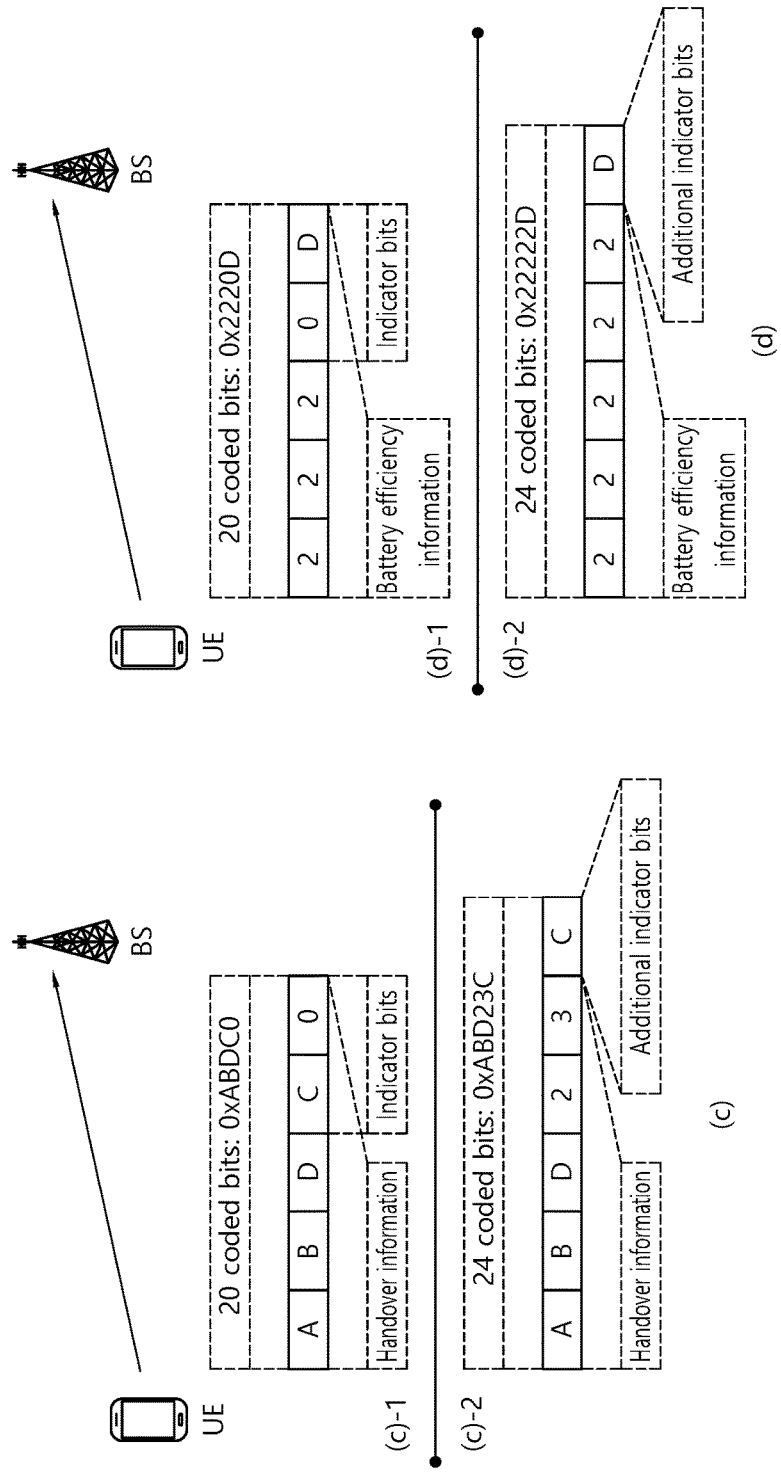

FIGS. 12A and 12B show a newly defined channel feedback format according to one embodiment of the present invention. In FIG. 12A, (a) shows an example of newly defined channel feedback format A, and (b) shows an example of newly defined channel feedback format B. In FIG. 12B, (c) shows an example of newly defined channel feedback format C, and (d) shows an example of newly defined channel feedback format D.

The channel feedback formats may use a 20-bit channel feedback format for an existing LTE network. Alternatively, when a new channel feedback format is available in a system, channel feedback format A may use a 24-bit channel feedback format. A 20-bit channel feedback format may be established such that a 4-bit indicator representing channel quality is repeated five times. In this case, lower 8 bits are divided by 4 bits and are distinguished from each other, thereby establishing a total of four channel feedback formats. The total of four channel feedback formats may be used as an indicator for reporting a UE operation (a normal mode, a handover preparation mode, and a battery efficiency mode) of the present invention to a BS and as an indicator for reporting the change of a UE group to a BS.

Channel feedback format A may be a channel feedback format for reporting to a BS that a UE operates in the normal mode. Referring to (a)-1 of FIG. 12A, when a 20-bit channel feedback format is used, channel feedback format A may be set such that lower 8 bits are divided by 4 bits and repeated bits have a value other than 0. Referring to (a)-2 of FIG. 12A, when a 24-bit channel feedback format is used, channel feedback format A may be set using lower 4 bits.

Channel feedback format B may be a channel feedback format for reporting to a BS that the classification of a UE classified as an ESG has been changed. Referring to (b)-1 of FIG. 12A, when a 20-bit channel feedback format is used, channel feedback format B may be set such that all lower 8 bits are 0. Referring to (b)-2 of FIG. 12A, when a 24-bit channel feedback format is used, channel feedback format B may be set using lower 4 bits.

Channel feedback format C may be a channel feedback format for reporting to a BS that a UE operates in the handover preparation mode. Referring to (c)-1 of FIG. 12B, when a 20-bit channel feedback format is used, upper 12 bits may be used to transmit handover preparation information, and lower 8 bits may be used as indicator bits for indicating channel feedback format C. Channel feedback format C may be set such that the indicator bits are divided into upper 4 bits and lower 4 bits, the upper 4 bits are not 0, and the lower 4 bits are 0. Channel feedback format C is distinguished from channel feedback format A in which the upper 4 bits and the lower 4 bits, which are the same, are repeated and thus only one of the upper 4 bits and the lower 4 bits cannot be 0. Referring to (c)-2 of FIG. 12B, when a 24-bit channel feedback format is used, channel feedback format C may be set using lower 4 bits. Handover preparation information may include the IDs of top three BSs having high received signal strength based on a reference signal from a neighboring BS measured by a UE. When a 24-bit channel feedback format is used, mobility information on the UE may be included in additional 8 bits. Here, the handover information included in channel feedback format C is not limited to the IDs of the BSs or the mobility information on the UE but may further include additional handover information.

Channel feedback format D may be a channel feedback format for reporting to a BS that a UE operates in the battery efficiency mode. Referring to (d)-1 of FIG. 12B, when a 20-bit channel feedback format is used, upper 12 bits may be used to transmit battery efficiency mode information (e.g., a battery efficiency mode period) set proactively by the UE, and lower 8 bits may be used as indicator bits for indicating channel feedback format C. Channel feedback format D may be set such that the indicator bits are divided into upper 4 bits and lower 4 bits, the upper 4 bits are 0, and the lower 4 bits are not 0. Referring to (d)-2 of FIG. 12B, when a 24-bit channel feedback format is used, channel feedback format D may be set using lower 4 bits. Regarding the battery efficiency mode information, battery efficiency mode period configuration information may be set as a multiple of a channel information report period received from the BS. Further, battery efficiency mode period information may be repeatedly loaded three times in a 20-bit format, and five times in a 24-bit format. For example, in (d) of FIG. 12B, the UE may report to the BS that the UE proactively operates in the battery efficiency mode. Furthermore, the UE may report to the BS through channel feedback format D that the battery efficiency mode period is set to be two times the channel feedback period. A method for setting a battery efficiency mode period has been described in FIG. 11, and thus a description thereof is omitted herein.

Figure 13:
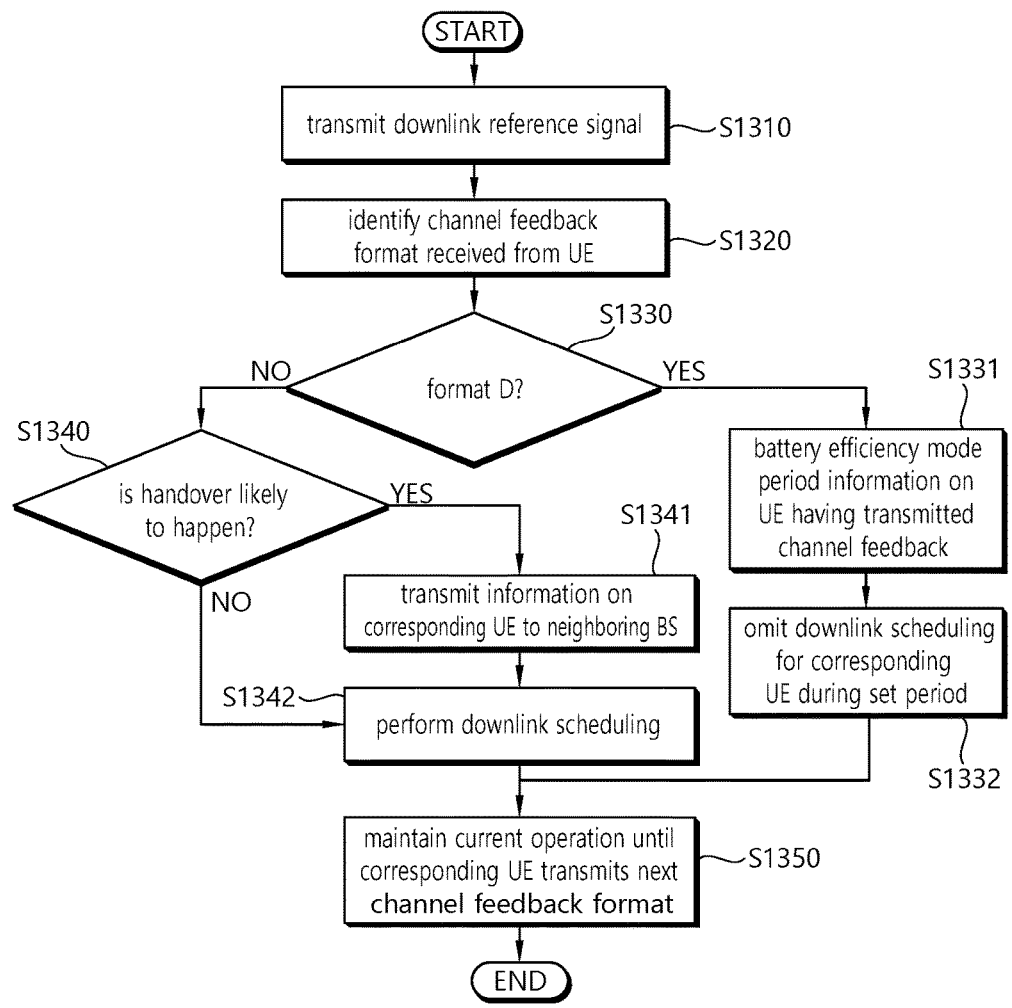
FIG. 13 shows a method for a BS to selectively perform an operation based on a channel feedback format according to one embodiment of the present invention.

FIG. 13 shows a method for a BS to selectively perform an operation based on a channel feedback format according to one embodiment of the present invention.

Referring to FIG. 13, a BS may transmit a downlink reference signal to a UE (S1310). The BS may periodically broadcast a downlink reference signal, thereby assisting the UE in predicting downlink channel quality.

The BS may identify a channel feedback format received from the UE (S1320). The BS may determine a subsequent operation of the BS based on the received channel feedback format.

The BS may preferentially determine whether the channel feedback format is channel feedback format D (1330).

When the received channel feedback format is channel feedback format D, the BS acquires battery efficiency mode period information on the UE that has transmitted the channel feedback (S1331) and may not perform downlink scheduling for the UE during a corresponding period (S1332). Upon receiving channel feedback format D, the BS may recognize that the channel quality of the UE that has transmitted channel feedback format D is not good and may not perform downlink scheduling for the UE until the next channel feedback is transmitted from the UE. The time at which the next channel feedback is transmitted may be predicted through the battery efficiency mode period information included in channel feedback format D.

When the received channel feedback format is not channel feedback format D, the BS may determine whether the received channel feedback format is channel feedback format C (S1340).

When the received channel feedback format is channel feedback format C, the BS may determine which neighboring BS the UE is approaching based on information included in channel feedback format C and may report in advance the possibility of handover of the UE to the neighboring BS (S1341). Further, since the UE is classified as a UE having a high possibility of handover, the BS may perform downlink scheduling in order to transmit data stored in the BS to the UE before the handover (S1342).

When the received channel feedback format is not channel feedback format C, the BS may regard the received channel feedback format as channel feedback format A. In the embodiment of the present invention, since channel feedback format B is used to indicate a UE group classification, not to indicate a UE operation classification, a UE classified as an EIG cannot transmit channel feedback format B. Channel feedback format A means that the UE has a current channel quality value higher than a threshold value and thus desires to operate in the normal mode. Accordingly, the BS may normally perform downlink scheduling, instead of performing a special operation for the UE (S1342).

The BS may maintain the current operation until the UE having transmitted the channel feedback transmits the next channel feedback (S1350).

Figure 14:
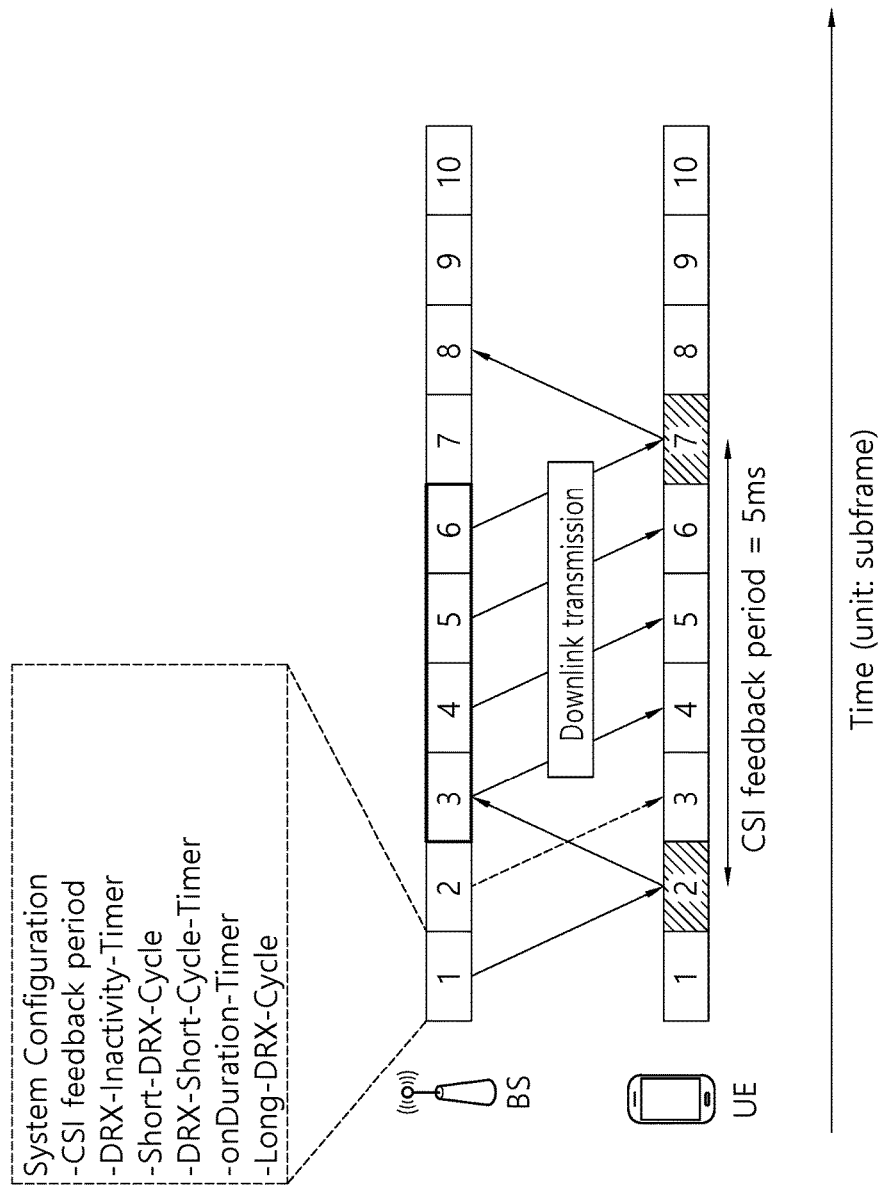
FIG. 14 shows an example in which a UE and a BS operate in a normal mode according to one embodiment of the present invention.

FIG. 14 shows an example in which a UE and a BS operate in the normal mode according to one embodiment of the present invention.

Referring to FIG. 14, in a first subframe, a UE may receive system configuration information including a channel information report period, a DRX configuration parameter, or the like from a BS. In a second subframe, the UE may determine whether to report channel information to the BS through metric calculation and judgment. In a third subframe, the BS may perform downlink scheduling and downlink transmission based on the channel information received from the UE.

Figure 15:
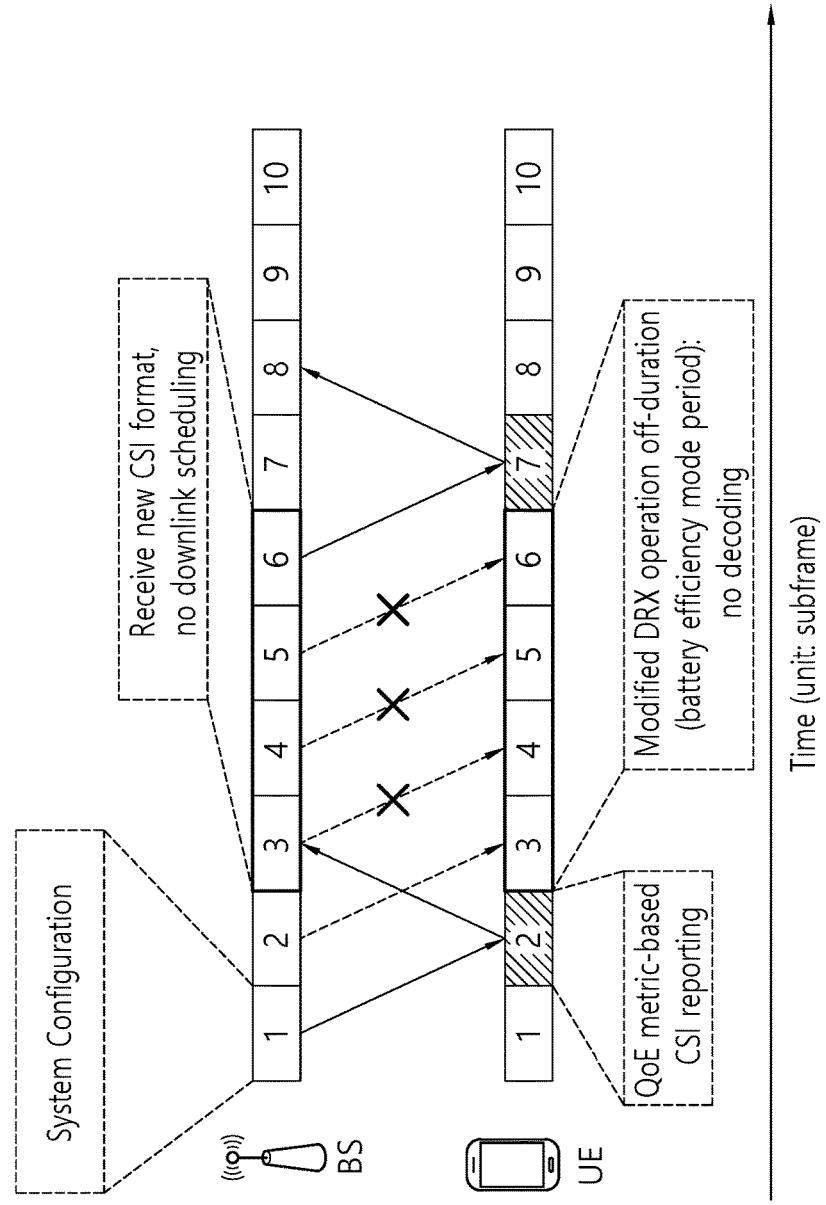
FIG. 15 shows an example in which a UE and a BS operate in a battery efficiency mode according to one embodiment of the present invention.

FIG. 15 shows an example in which a UE and a BS operate in the battery efficiency mode according to one embodiment of the present invention.

Referring to FIG. 15, in a first subframe, a UE may receive system configuration information including a channel information report period, a DRX configuration parameter, or the like from a BS. In a second subframe, the UE may determine whether to report channel information to the BS through metric calculation and judgment. When calculated channel quality is less than a channel quality threshold value and the possibility of handover of the UE is low, the UE may transmit a battery efficiency mode indicator to the BS. The battery efficiency mode indicator may be transmitted via a channel feedback format. The channel feedback format may be channel feedback format D.

Since the UE can predict that the UE will not receive downlink transmission until the next channel information report period arrives after transmitting the battery efficiency mode indicator to the BS, the UE can immediately stop data transmission and reception without waiting for a DRX inactivity timer or a DRX command. For example, after the UE transmits the battery efficiency mode indicator to the BS in the second subframe, the UE may stop data transmission and reception from a third subframe.

After receiving the battery efficiency mode indicator from the UE, the BS may not perform downlink scheduling for the UE.

Referring to FIG. 4, since a conventional UE cannot predict whether downlink scheduling is performed, the UE determines whether to stop data transmission and reception based on a DRX inactivity timer or a DRX command. However, according to the technical idea of the present invention, since a UE may autonomously determine whether to operate in the battery efficiency mode based on the channel quality and the remaining battery level and can predict whether downlink scheduling is performed, the UE can autonomously determine whether to stop data transmission and reception. Accordingly, user-perceived quality may be improved.

Figure 16:
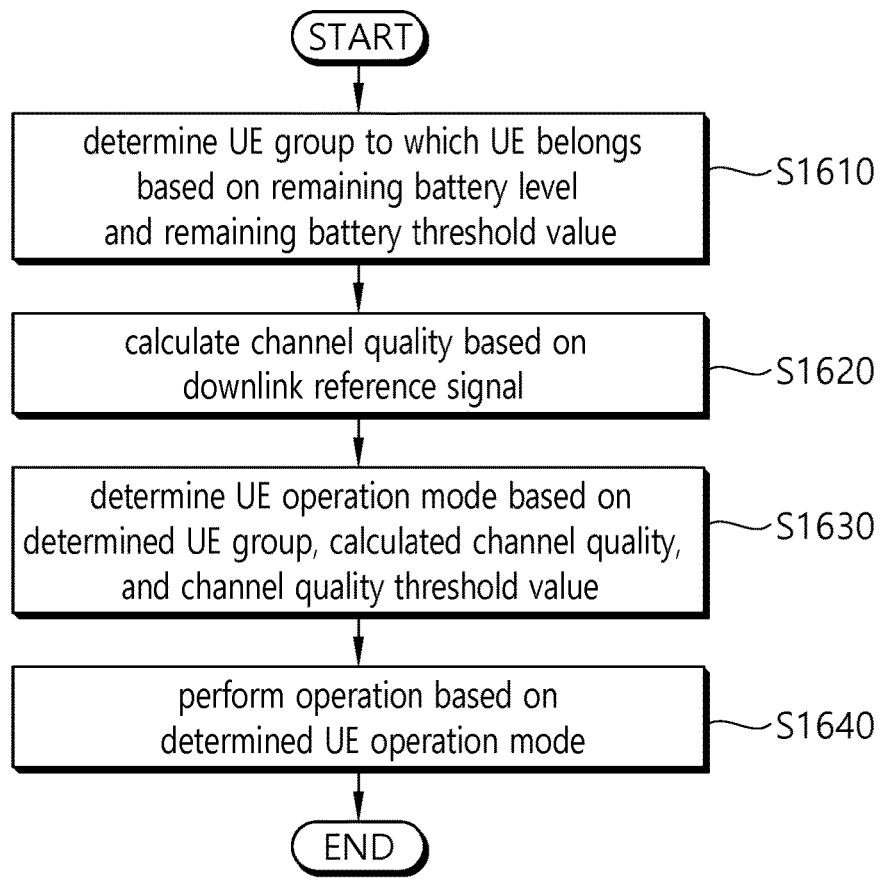
FIG. 16 is a block diagram illustrating a method for a UE to selectively perform an opration based on a UE operation mode according to one embodiment of the present invention.

FIG. 16 is a block diagram illustrating a method for a UE to selectively perform an opration based on a UE operation mode according to one embodiment of the present invention.

Referring to FIG. 16, a UE may determine a UE group to which the UE belongs based on a remaining battery level and a remaining battery threshold value (S1610). The UE group may be either an energy-insufficient group (EIG) or an energy-sufficient group (ESG).

The UE may calculate channel quality based on a downlink reference signal (S1620).

The UE may determine a UE operation mode based on the determined UE group, the calculated channel quality, and a channel quality threshold value (S1630).

When the determined UE group is the EIG, the calculated channel quality is equal to or less than the channel quality threshold value, and the UE is not scheduled to be handed over, the UE operation mode may be determined to be the battery efficiency mode. The remaining battery level may be equal to or less than the remaining battery threshold value. The UE may stop data transmission and reception until the channel quality exceeds the channel quality threshold value. The UE may set off-duration for stopping data transmission and reception. In this case, the UE may stop data transmission and reception during the off-duration. The off-duration may be set by the UE based on the calculated channel quality, the channel quality threshold value, and a delay constraint of the UE. The UE may transmit a battery efficiency mode indicator to the BS.

When the determined UE group is the EIG, the calculated channel quality is equal to or less than the channel quality threshold value, and the UE is scheduled to be handed over, the UE operation mode may be determined to be the handover preparation mode. The remaining battery level may be equal to or less than the remaining battery threshold value. The UE may transmit a handover candidate BS index to the BS. The handover candidate BS index may be set by the UE based on a reference signal measurement.

When the determined UE group is the EIG and the calculated channel quality exceeds the channel quality threshold value, the UE operating mode may be determined to be the normal mode. The remaining battery level may be equal to or less than the remaining battery threshold value.

The UE may perform an operation based on the determined UE operation mode (S1640).

The UE may transmit a channel feedback format corresponding to the determined UE operation mode to the BS.

When the UE group to which the UE belongs is changed, the UE may transmit the changed UE group to the BS. When the UE is in the RRC_CONNECTED mode, the changed UE group may be transmitted to the BS using a channel feedback format. When the UE is in the RRC_IDLE mode, the changed UE group may be transmitted to the BS using a random access procedure.

Figure 17:
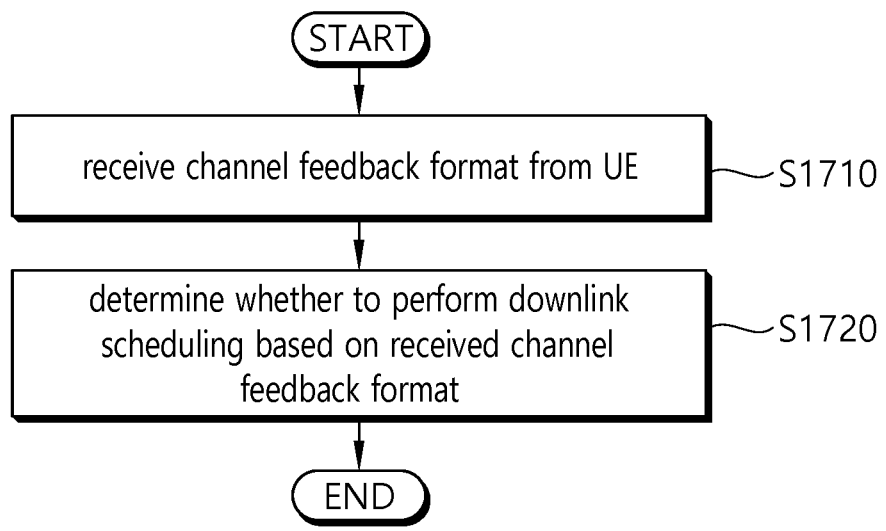
FIG. 17 is a block diagram illustrating a method for a BS to selectively perform downlink scheduling based on a channel feedback format according to one embodiment of the present invention.

FIG. 17 is a block diagram illustrating a method for a BS to selectively perform downlink scheduling based on a channel feedback format according to one embodiment of the present invention.

Referring to FIG. 17, a BS may receive a channel feedback format from a UE (S1710).

The BS may determine whether to perform downlink scheduling based on the received channel feedback format (S1720).

When the channel feedback format indicates that the UE operates in the battery efficiency mode, the BS may determine not to perform downlink scheduling. The downlink scheduling may not be performed until the BS receives another channel feedback format from the UE.

When the channel feedback format indicates that the UE operates in the handover mode, the BS may determine to perform downlink scheduling. The BS may transmit the possibility of handover of the UE to a neighboring BS based on information included in the channel feedback format.

Figure 18:
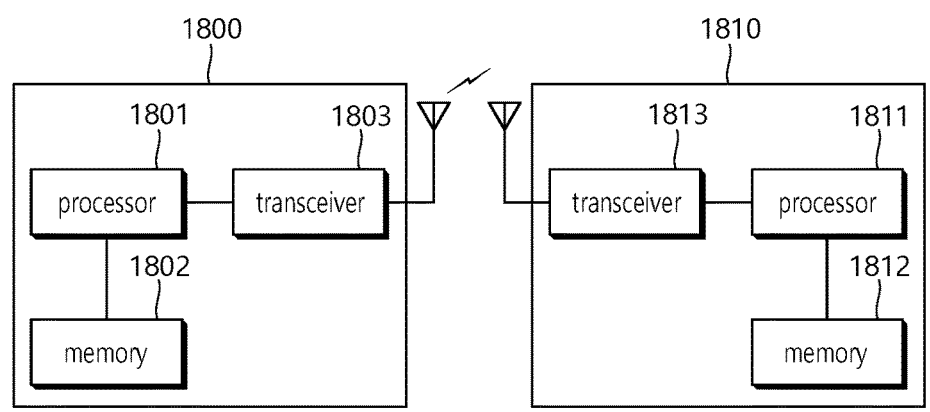
FIG. 18 is a block diagram illustrating a wireless communication system according to the embodiment of the present invention.

FIG. 18 is a block diagram illustrating a wireless communication system according to the embodiment of the present invention.

A BS 1800 includes a processor 1801, a memory 1802 and a transceiver 1803. The memory 1802 is connected to the processor 1801, and stores various information for driving the processor 1801. The transceiver 1803 is connected to the processor 1801, and transmits and/or receives radio signals. The processor 1801 implements proposed functions, processes and/or methods. In the above embodiment, an operation of the base station may be implemented by the processor 1801.

A UE 1810 includes a processor 1811, a memory 1812 and a transceiver 1813. The memory 1812 is connected to the processor 1811, and stores various information for driving the processor 1811. The transceiver 1813 is connected to the processor 1811, and transmits and/or receives radio signals. The processor 1811 implements proposed functions, processes and/or methods. In the above embodiment, an operation of the UE may be implemented by the processor 1811.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for selectively performing, by a user equipment (UE), an operation based on a UE operation mode in a wireless communication system, the method comprising:
   determining a UE group to which the UE belongs based on a remaining battery level and a remaining battery threshold value;
   calculating channel quality based on a downlink reference signal;
   determining a UE operation mode based on the determined UE group, the calculated channel quality, and a channel quality threshold value; and
   performing an operation based on the determined UE operation mode,
   wherein the UE group is either an energy-insufficient group (EIG) or an energy-sufficient group (ESG).

2. The method of claim 1, wherein when the determined UE group is the EIG, the calculated channel quality is equal to or less than the channel quality threshold value, and the UE is not scheduled to be handed over, the UE operation mode is determined to be a battery efficiency mode.

3. The method of claim 2, wherein the remaining battery level is equal to or less than the remaining battery threshold value.

4. The method of claim 3, further comprising stopping, by the UE, data transmission and reception until the channel quality exceeds the channel quality threshold value.

5. The method of claim 3, further comprising setting, by the UE, off-duration for stopping data transmission and reception.

6. The method of claim 5, wherein the off-duration is set by the UE based on the calculated channel quality, the channel quality threshold value, and a delay constraint of the UE.

7. The method of claim 3, further comprising transmitting, by the UE, a battery efficiency mode indicator to a base station (BS).

8. The method of claim 1, wherein when the determined UE group is the EIG, the calculated channel quality is equal to or less than the channel quality threshold value, and the UE is scheduled to be handed over, the UE operation mode is determined to be a handover preparation mode.

9. The method of claim 8, further comprising transmitting, by the UE, a handover candidate BS index to a BS, wherein the handover candidate BS index is set by the UE based on a reference signal measurement.

10. The method of claim 1, wherein when the determined UE group is the EIG and the calculated channel quality exceeds the channel quality threshold value, the UE operating mode is determined to be a normal mode.

11. The method of claim 1, further comprising transmitting, by the UE, a channel feedback format corresponding to the determined UE operation mode to a BS.

12. The method of claim 1, further comprising transmitting, by the UE, a changed UE group to a BS when the UE group to which the UE belongs is changed,
- wherein: when the UE is in an RRC_CONNECTED mode, the changed UE group is transmitted to the BS using a channel feedback format; and
- when the UE is in an RRC_IDLE mode, the changed UE group is transmitted to the BS using a random access procedure.

13. A user equipment (UE) for selectively performing an operation based on a UE operation mode in a wireless communication system, the UE comprising:
- a memory;
- a transceiver; and
- a processor to connect the memory and the transceiver, wherein the processor is configured to:
- determine a UE group to which the UE belongs based on a remaining battery level and a remaining battery threshold value;
- calculate channel quality based on a downlink reference signal;
- determine a UE operation mode based on the determined UE group, the calculated channel quality, and a channel quality threshold value; and
- perform an operation based on the determined UE operation mode, and
- the UE group is either an energy-insufficient group (EIG) or an energy-sufficient group (ESG).

* * * * *